3,394,009
PREPARATION OF BAKED PRODUCTS
William H. Knightly, Wilmington, Del., assignor to Atlas Chemical Industries, Inc., Wilmington, Del., a corporation of Delaware
No Drawing. Filed July 24, 1964, Ser. No. 385,036
6 Claims. (Cl. 99—91)

ABSTRACT OF THE DISCLOSURE

A softener and mold inhibitor for baked products comprising a composition containing esters of a lower monocarboxylic acid and a polyhydric alcohol incorporated into the ingredients of the dough or batter of the product prior to baking.

---

This invention relates to an improvement in the preparation of baked products. In particular, this invention relates to an improved liquid softening agent and mold inhibitor for baked products.

It is current practice in the preparation of yeast-leavened baked products, such as bread, rolls and sweet doughs, to incorporate a softener or anti-stalant in the dough and also a fungistat to inhibit microbiological growth in the yeast-leavened products. The softeners most generally used are mixtures of mono- and diglycerides which are plastic materials and are difficult to handle, measure and thoroughly disperse in the dough. Previous attempts to use liquid softeners have been unsuccessful because of adverse effects on dough condition and the resulting baked product.

In addition to the softeners, fungistatic agents are also incorporated into yeast-leavened baked goods. The fungistatic agents most generally used are calcium or sodium propionates. These propionate salts are effective in inhibiting microbiological growth, but also adversely affect the functioning of the yeast as demonstraated by increased proof time and in some instances poorer grain and volume.

In view of the long periods of time which may expire between the preparation and consumption of baked goods, such as cakes and cupcakes, it is considered desirable in some instances to incorporate fungistats in this type of baked product. It is important that the fungistatic agent not have a substantial adverse effect on the quality of the final baked product.

It is an object of this invention to provide an improvement in the preparation of baked products.

It is another object to provide a liquid softening agent and fungistat which is easy to handle, is readily incorporated into dough and does not adversely affect proof time, grain and volume of yeast-leavened baked products.

Other objects and purposes of this invention will be apparent to those skilled in the art in view of the description which follows.

It has been discovered that lower monocarboxylic acid esters of glycerin and isosorbide are effective softening agents and fungistats when incorporated into baked products. These lower monocarboxylic acid esters are generally liquids which are easy to measure and handle. Since these esters are liquids, they are readily incorporated into the dough or batter of baked goods prior to baking, and they do not adversely affect dough conditioning, i.e. the handling and machining characteristics of the dough. The esters also function as fungistats and do not adversely affect proof time at the recommended levels of use as do the propionate salts which are currently used as fungistats. In addition, the lower monocarboxylic acid esters of glycerin and/or isosorbide do not adversely affect the grain and volume characteristics of the resulting baked products.

The softeners and fungistats useful in this invention comprise complete and partial esters of glycerin and isosorbide and their mixtures. Though the lower monocarboxylic acid esters may be used in relatively pure form, generally in preparing the esters mixtures are formed, and it is convenient to use the mixture and thereby avoid a purification procedure. As used in this specification and the claims which follow, the term "lower monocarboxylic acid esters of glycerin" includes mono-, di- and triesters and mixtures thereof, and the term "lower monocarboxylic acid esters of isosorbide" includes mono- and diesters and mixtures thereof.

The term "lower monocarbojylic acids" as used in this specification and the claims which follow includes those monocarboxylic acids having from 2 to 7 carbon atoms. Examples of monocarboxylic acids which may be used to esterify the glycerin or isosorbide are acetic, propionic, butyric, valeric, caproic, sorbic and benzoic. It is particularly preferred to use propionic, sorbic or benzoic acids, for these acids provide especially effective fungistatic properties. Propionic acid has been found to be particularly effective. In addition to using the acids, their equivalent halides, anhydrides and esters may also be used to carry out the esterification. Conventional esterification procedures may be used to prepare the glycerin and isosorbide esters, and therefore their preparation does not have to be described in detail.

The compositions of the present invention are usually incorporated into baked products in amounts which are sufficient effectively to inhibit the growth of mold during storage for durations of about a week and also sufficient to preserve the softness of the product during storage. In general, amounts of the lower monocarboxylic acid ester as little as about 0.04% based on the weight of the flour contained in the product are sufficient for effective mold growth inhibition in the product. Since greater amounts of the compositions of the present invention are required to impart the desired softening or anti-staling characteristics to the baked product, the critical concentrations of the said composition in the baked product are accordingly determined by the amounts required for that purpose. In general, in yeast leavened products, from about 0.2% to about 1.0% of the composition based upon the weight of the flour in the product is sufficient to impart both mold growth inhibition and softness or anti-staling properties to the baked product; in baked products which do not contain yeast however, the compositions of the present invention are usually used in amounts within a range of about 0.8% to about 20.0% based upon the weight of the flour in the baked product.

The following examples demonstrate the preparation of propionate esters of glycerin and isosorbide and their use as softening agents and fungistatic agents.

About 460 g. of glycerin (5 moles) were placed in a 3-necked flask equipped with a mechanical stirrer, condenser, thermometer and dropping funnel. 1250 g. (9.65 moles) of propionic anhydride was added dropwise at a temperature of 125–130° C. over a period of 2.25 hours. The reaction mixture was heated for 8 hours at 100–110° C. after the propionic anhydride had been added. Propionic acid was stripped off under reduced pressure, and the resulting mixture was distilled over a 10 inch vigreux column. The following four liquid cuts were collected:

|  | Pot Temp. (° C.) | Vap. Temp. (° C.) | Sap. No. | OH No. | Acid No. | Grams Collected | Yield, Percent |
|---|---|---|---|---|---|---|---|
| Cut #1 | 110–115 | 98–100 | 542 | 298.5 | 7.45 | 176 | 18.2 |
| Cut #2 | 116 | 107 | 548 | 274 | 1.07 | 135 | 14.1 |
| Cut #3 | 114–121 | 105–110 | 561 | 244 | 0.65 | 243 | 25.4 |
| Cut #4 | 117–120 | 105–110 | 570 | 190 | 0.30 | 360 | 38.1 |
| Residue |  |  | 561 | 158 | 0.66 | 40 | 4.2 |

The approximate composition of each fraction was as follows:

Cut #1—5% mono- and 95% dipropionate
Cut #2—100% dipropionate
Cut #3—2% mono- and tri- and 98% dipropionate
Cut #4—70% di- and 30% tripropionate Example II.—Preparation of isosorbide dipropionate A three liter 3-necked flask ekuipped with a stirrer, thermometer, dropping funnel and a reflux condenser was charged with 438.3 g. (3 moles) of isosorbide and 2 g. of p-toluene-sulfonic acid. The isosorbide was heated to 80° C., and then 858 g. (6 moles plus 10% excess) of propionic anhydride were added dropwise with stirring over a 90 minute period. The temperature during the addition varied between 80–90° C. Thereafter, the reaction mixture was heated for 10 hours at 100° C. and then for 4 hours at 155–160° C., after which propionic acid and excess propionic anhydride were stripped off under vacuum.

The resulting liquid product was treated with 10 g. of activated carbon and distilled through a 10 inch vigreux column at 135–138° C. and 0.5 mm. pressure. 540 g. of isosorbide dipropionate was obtained.

Example III—Preparation of bread using propionate esters of glycerin and isosorbide as softening agents The following bread formula and procedures were utilized to evaluate several propionate esters as bread softening agents according to the sponge-dough method:

Sponge: Percent (flour as 100%)
Flour _____ 65
Water _____ [1]Variable
Yeast _____ 2.5
Yeast food _____ 0.5

Dough:
Flour _____ 35
Sugar _____ 8
Salt _____ 2
Lard _____ 3
Milk powder _____ 6
Softening Agent _____ 0.25
Water _____ [1]Variable

[1] 57% of the total water was added to the sponge and 43% was added to the dough. The total amount of water used varied depending upon the flour absorption properties. The amount of water required was determined by a farinograph method which is described in Cereal Laboratory Methods compiled by American Association of Cereal Chemists, 6th ed., pp. 132–139.

The sponges were prepared by dissolving the yeast in a portion of the water, and this composition was added to a mixer along with flour, yeast food and the balance of the water. These ingredients were mixed for about 3 minutes and thereafter fermented for about 4.5 hours.

The fermented sponges were returned to the mixer and all of the dough ingredients were added. The dough-sponge mixtures were mixed to full development (usually about 11 to 13 minutes), fermented for 20 minutes, divided, allowed a 10 minute proof, sheeted, molded, sealed and placed into bread pans. Then the dough was proofed at about 100° F. and 85% relative humidity in the usual manner to template height and baked for about 20 minutes at 425° F.

Prior to baking, the bread dough was evaluated for dough conditioning properties and proof time. After baking, the bread was evaluated for volume, grain and softness. Softness studies on half-inch thick bread slices were carried out over a period of 6 days using a gelometer to determine softness. The gelometer value represents the number of grams of shot required to depress the gelometer plunger a given distance (4 mm. in these evaluations) into the bread slice.

The softness data are given for the first day (day following baking), second to fourth day and fifth to seventh day. The data obtained on the second to fourth day are considered to be of greatest significance. Readings obtained on the first day are generally conceded to be a reflection of the extent of baking, while those obtained on the fifth to seventh day are considered of less importance since little bread remains to be consumed this long after baking.

Using the glyceryl propionate esters of Example I and the isosorbide dipropionate of Example II as softening agents, the baking of three loaves of bread with each softening agent yielded the following results:

| Softening Agent | Dough Conditioning | Proof Time (min.) | Volume (cc.) | | | | Gelometer Values | | | Grain | | |
|---|---|---|---|---|---|---|---|---|---|---|---|---|
| | | | A | B | C | Avg. | 1 Day | 4 Days | 6 Days | 1 Day | 4 Days | 6 Days |
| Control (no softener)[1] | Very good | 75 | 2,600 | 2,625 | 2,650 | 2,625 | 215 | 262 | 385 | Very good | Good | Very good. |
| Cut #1 | do | 65 | 2,700 | 2,730 | 2,750 | 2,727 | 202 | 245 | 373 | do | V. good | Do. |
| Cut #2 | do | 65 | 2,775 | 2,750 | 2,735 | 2,753 | 190 | 243 | 364 | Good | do | Good. |
| Cut #3 | do | 65 | 2,650 | 2,675 | 2,675 | 2,667 | 209 | 245 | 371 | do | Good | Very good. |
| Cut #4 | do | 64 | 2,700 | 2,675 | 2,700 | 2,692 | 207 | 249 | 353 | do | do | Do. |
| | | | | | | | | (2 Days) | | | (2 Days) | |
| Isosorbide Dipropionate [2] | Good | 73 | 2,650 | 2,675 | 2,660 | 2,663 | 241 | 358 | 375 | Good | Good | Good. |
| Control (no softener)[1] | Very good | 90 | 2,500 | 2,550 | 2,525 | 2,525 | 261 | 398 | 419 | Fair | V. Good | Very good. |

[1] The controls contained 0.25% calcium propionate bread preservative.
[2] The isosorbide dipropionate and glyceryl propionates were evaluated in separate tests.

These results demonstrate that the propionate esters definitely improved bread volume and bread softness. In addition, the propionate esters did not adveresely affect proof time, dough conditioning or the bread grain.

Example IV

The procedures and evaluations of Example III were repeated using 0.5% per flour weight of the softening agents instead of 0.25 as in Example III. The results are reported in the following table:

Then 99.8 g. of whole eggs and 50 g. of water were added, and the mixing was continued at speed No. 2 for

| Softening Agent | Dough Conditioning | Proof Time (min.) | Volume (cc.) | | | | Gelometer Values | | | Grain | | |
|---|---|---|---|---|---|---|---|---|---|---|---|---|
| | | | A | B | C | Avg. | 1 Day | 4 Days | 6 Days | 1 Day | 4 Days | 6 Days |
| Control (no softener)[1] | Very good | 105 | 2,525 | 2,525 | 2,515 | 2,522 | 231 | 342 | 392 | Fair | Fair | Good. |
| Cut #1 | Good | 82 | 2,625 | 2,600 | 2,615 | 2,613 | 236 | 335 | 346 | do | do | Fair. |
| Cut #2 | do | 80 | 2,550 | 2,550 | 2,565 | 2,555 | 234 | 318 | 361 | Good | Good | Good. |
| Cut #3 | do | 80 | 2,550 | 2,565 | 2,560 | 2,558 | 210 | 322 | 337 | Fair | do | Do. |
| Cut #4 | do | 82 | 2,525 | 2,550 | 2,550 | 2,542 | 225 | 312 | 330 | Good | do | Do. |
| Isosorbide Dipropionate [2] | do | 68 | 2,750 | 2,750 | 2,735 | 2,740 | 208 | 310 | 382 | do | V. good | Do. |
| Control (no softener)[1] | Very good | 110 | 2,475 | 2,450 | 2,500 | 2,475 | 233 | 411 | 481 | do | Fair | Fair. |

[1] The controls contained 0.5% calcium propionate bread preservative.
[2] The isosorbide dipropionate and glyceryl propionates were evaluated in separate tests.

These results corroborate the improvements in the preparation of bread which were demonstrated in Example III.

Example V

The glyceryl propionate and isosorbide propionate additives which were tested for their softening effect in bread in Examples III and IV were also evaluated for fungistatic effect. The loaves of bread, which were prepared in the manner described in Example III, were exposed to room conditions and thereafter were stored at 100° F. and 85% relative humidity. These storage conditions were selected to promote the growth of mold. The efficiency of the propionate esters in retarding the development of mold was evaluated by observing the development of mold. The control contained no fungistatic agent. The results were as follows:

PRESERVATIVE EFFECT

| Fungistatic-Agent | Amount (percent F.W.) | 3 Days | 8 Days | 10 Days |
|---|---|---|---|---|
| Control (no fungistat) | | No mold | Moldy | |
| Cut #1 | 0.25 | do | No mold | No mold. |
| Cut #2 | 0.25 | do | do | Do. |
| Cut #3 | 0.25 | do | do | Do. |
| Cut #4 | 0.25 | do | do | Do. |
| Cut #1 | 0.5 | do | do | Do. |
| Cut #2 | 0.5 | do | do | Do. |
| Cut #3 | 0.5 | do | do | Do. |
| Cut #4 | 0.5 | do | do | Do. |
| Isosorbide Dipropionate | 0.25 | do | do | Do. |
| Do | 0.5 | do | do | Do. |

These results clearly demonstrate the fungistatic effect of the glyceryl propionates and isosorbide dipropionates.

Example VI

Hydrogenated vegetable oil shortening containing 5% by weight isosorbide monopropionate in one instance, and 5% by weight glyceryl dipropionate in the other, was used to prepare a devils' food cake. The following formulation was used:

| | Grams |
|---|---|
| Cake flour | 181.6 |
| Sugar | 236.1 |
| Baking soda | 3.4 |
| Breakfast cocoa | 36.3 |
| Nonfat dry milk | 31.7 |
| Salt | 5.66 |
| Baking powder | 9.06 |
| Hydrogenated vegetable oil shortening containing 5% propionate | 75 |
| Water | 127 |

The above listed ingredients were added to a mixing bowl and mixed for 3 minutes at speed No. 1 in a Hobart mixer. 51 g. of water was then added and the mixing continued at speed No. 2 for 2 minutes. another 2 minutes. Upon completion of the mixing, 2 eight inch pans were filled with 350 g. of batter each and were baked at 350° F. for 27 minutes.

The results were as follows:

| Shortening Containing— | Cake Batter | Batter Sp. G. | Symmetry of Rise | Cake Vol. (cc.) | Cake Grain |
|---|---|---|---|---|---|
| 5% Isosorbide Monopropionate | Thin | 0.92 | Good | 2,090 | Good. |
| 5% Glyceryl Dipropionate | do | 0.94 | do | 2,020 | Do. |

These results demonstrate that the glyceryl dipropionate and isosorbide monopropionate functioned as an emulsifier for the cake formulation. These esters would also contribute their fungistatic properties to the cake which helps to preserve the cake.

Example VII

Using the bread formulation and procedures of Example III, glyceryl monobenzoate was incorporated into the formulation and was tested as a softening agent and fungistatic agent. The glyceryl monobenzoate was used at a level of 0.5% by weight of flour. The bread which was produced had good volume, better softness than a control containing no softening agent, and was rated as good with respect to anti-mold performance.

Example VIII

Using the bread formulation and procedures of Example III, glyceryl monosorbate is incorporated into the formulation and tested as a softening agent and fungistatic agent. The glyceryl monosorbate may be used at a level of 0.25% by weight of flour. The resulting bread product has good volume, good softness and very good anti-mold performance.

Having completely described this invention, what is claimed is:

1. In the preparation of a baked product, the improvement which comprises the steps of incorporating into the wet ingredients thereof prior to baking from about 0.2 percent to about 20.0 percent by weight, based upon the weight of the flour in said product, of an antistalent and antimycotic composition consisting essentially of esters of a lower monocarboxylic acid selected from the group consisting of sorbic acid, benzoic acid and propionic acid and a polyhydric compound selected from the group consisting of glycerine and isosorbide and then baking the resultant product.

2. The improvement of claim 1 in which the baked product to be prepared is yeast-leavened.

3. The improvement of claim 2 in which the polyhydric compound is glycerin.

4. The improvement of claim 3 in which the lower monocarboxylic acid ester is a propionate.

5. The improvement of claim 4 in which the glycerin ester is glyceryl dipropionate.

6. The improvement of claim 4 in which the glycerin ester is glyceryl tripropionate.

(References on following page)

References Cited

UNITED STATES PATENTS

| | | | |
|---|---|---|---|
| 2,446,505 | 8/1948 | Arenson | 99—91 X |
| 2,509,414 | 5/1950 | Barsky | 99—118 |
| 2,978,329 | 4/1961 | Cochran et al. | 99—91 X |
| 3,111,409 | 11/1963 | Jackson et al. | 99—92 X |
| 3,117,010 | 1/1964 | Geisler | 99—118 |
| 3,244,534 | 4/1966 | Buddemeyer et al. | 99—92 X |
| 3,257,213 | 6/1966 | Colby | 99—118 X |

RAYMOND N. JONES, *Primary Examiner.*

UNITED STATES PATENT OFFICE
CERTIFICATE OF CORRECTION

Patent No. 3,394,009                                July 23, 1968

William H. Knightly

It is certified that error appears in the above identified patent and that said Letters Patent are hereby corrected as shown below:

Column 1, line 13, after "alcohol" insert -- is --; line 39, "demonstraated" should read -- demonstrated --. Column 2, line 19, "monocarbojylic" should read -- monocarboxylic --; between lines 59 and 60, insert as a heading, -- Example I. -- Preparation of propionate esters of glycerin --. Column 3, line 22, "ekuipped" should read -- equipped --.

Signed and sealed this 24th day of February 1970.

(SEAL)
Attest:

Edward M. Fletcher, Jr.                      WILLIAM E. SCHUYLER, JR.
Attesting Officer                                   Commissioner of Patents